United States Patent [19]

Weiste et al.

[11] 3,837,753
[45] Sept. 24, 1974

[54] LONGITUDINALLY ADJUSTABLE GUIDE ROD

[76] Inventors: Helmut Weiste, Bad Sassendorf-Steningsen; Ferdinand Schumacher, Coesterweg 42, Soest 477, both of Germany

[22] Filed: Feb. 14, 1973

[21] Appl. No.: 332,493

[30] Foreign Application Priority Data
Mar. 30, 1972   Germany............................ 7212144

[52] U.S. Cl...................... 403/33, 403/44, 403/327, 403/343, 403/353, 74/527, 74/522, 280/482
[51] Int. Cl.............................................. F16b 7/14
[58] Field of Search ........... 403/104, 106, 107, 108, 403/43, 44, 46, 72, 80, 110, 109, 111, 330, 327, 316, 301, 300, 306, 314, 307, 343, 348, 353, 33, 325, 326; 56/14.9, 15.9; 74/522, 527

[56] References Cited
UNITED STATES PATENTS

| | | | |
|---|---|---|---|
| 2,029,609 | 2/1936 | Burns et al...................... | 403/343 X |
| 2,066,956 | 1/1937 | Williams............................ | 403/343 |
| 2,708,144 | 5/1955 | Carr.................................. | 403/118 X |
| 2,902,319 | 9/1959 | Mulder............................. | 403/108 X |
| 3,157,416 | 11/1964 | Sandbakken...................... | 403/104 |

*Primary Examiner*—Jordan Franklin
*Assistant Examiner*—Wayne L. Shedd
*Attorney, Agent, or Firm*—McGlew and Tuttle

[57] ABSTRACT

A guide rod particularly for connecting parts of agricultural implements comprises first and second telescopically interengageable rod portions each having an outer end with an eyelet or similar means for securing it to an implement part and each having an inner end which is interengaged with the respective inner end of the other rod portion. One of the rod portions carries a rotatable lock nut which has a plurality of circumferentially extending and circumferentially spaced and axially extending rows of projecting cams which engage in recesses between the cams of similar rows arranged on the other rod portion. The parts are locked together when the projecting cams of the nut engaged behind the cams of the other rod portion and spring biasing means is provided to urge the nut into a locking position. The parts may be disengaged by rotating the lock nut against the biasing spring to release them.

8 Claims, 2 Drawing Figures

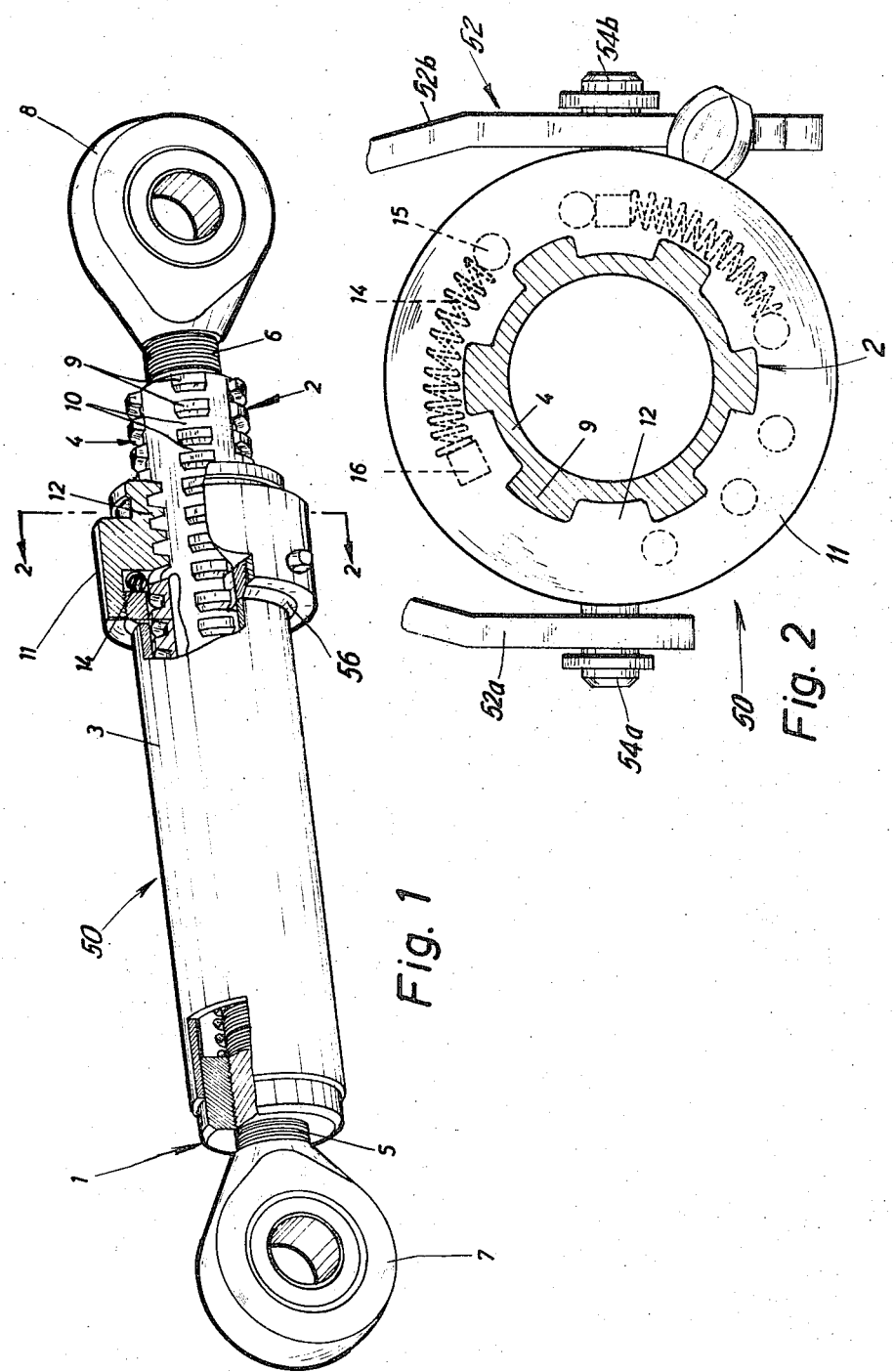

LONGITUDINALLY ADJUSTABLE GUIDE ROD

BACKGROUND OF THE INVENTION

1. Field of the Invention

This invention relates in general to the construction of a guide rod and in particular to a longitudinally adjustable upper guide rod for agricultural implements which includes two telescopically interengageable rod parts with means at the inner ends of the rod parts for interengaging and locking the rod parts together.

2. Description of the Prior Art

Longitudinally adjustable upper guide rods for agricultural implements are known which include two telescopical guide rod portions which move relative to each other and which includes means for locking the interengaged ends with a bolt lock mechanism. The bolt lock mechanism comprises a lock which is mounted for movement on one of the guide rod ends and which carries a bolt which moves transversely to the longitudinal axis of the guide rods and which can be passed through aligned bores provided in the two guide rod ends to lock the two guide rod ends together. A similar upper guide rod formed of two guide rod ends which can move relative to each other is known which includes a lock arranged at one guide rod end which is provided with a bolt extending transversely to the longitudinal axis of the guide rods and which can be inserted into grooves which are open at the top and which are provided in the two guide rod ends, but only when the grooves of the two guide rod ends are aligned with each other. The known device is at the disadvantage that considerable shearing forces act on the locking bolt during the locking and under the forces to be transmitted by the guide rods when they are in operation. This makes it necessary either to construct the entire guide rod construction very stable or to make the locking bolt at least of a very high grade material to achieve the necessary transmission of forces without destruction. The adjustable spacings between the guide rods is very great in the known constructions since there must be enough material left between the aligned bores or grooves to control the necessary forces.

SUMMARY OF THE INVENTION

In accordance with the present invention, there is provided a longitudinally adjustable upper guide rod which may be adjusted longitudinally in small adjustable intervals and which is capable of handling great forces safely despite the separation construction of the two guide rod elements. In accordance with the invention the guide rod includes two telescopically interengageable elements one of which carries a rotatable lock nut having a plurality of rows of circumferentially extending a circumferentially spaced and axially extending rows of projecting cams which lock behind similar cams arranged in similar rows of the other guide rod part. The lock nut may be rotated to a position in which the cams of the nut are moved out of alignment with the cams on the other part and positioned in the spaces between rows so that the parts may be disengaged. In addition a spring is arranged to bias the nut so that it rotates into an engaged position to retain the parts in a locked manner until they are released by rotation of the lock nut against the biasing spring. The return spring is advantageously arranged within the lock nut and acts to rotate the lock nut to a locking position. An operating lever is advantageously provided on the outside of the lock nut.

Accordingly it is an object of the invention to provide a guide rod particularly for connecting parts of an agricultural implement which comprises first and second telescopically interengageable rod portions each having an outer end with means for securing it to an implement part and each having an inner end which is interengaged with respective inner end of the other part, and with locking means for holding the parts together which comprises a rotatable lock nut on one part having cam means which engage behind cam means on the other part.

A further object of the invention is to provide a guide rod which is simple in design, rugged in construction and economical to manufacture.

For an understanding of the principles of the invention reference is made to the following description of a typical embodiment thereof as illustrated in the accompanying drawing.

BRIEF DESCRIPTION OF THE DRAWING

In the Drawing:

FIG. 1 is a side perspective view partly broken away of an upper guide rod for an agricultural implement constructed in accordance with the invention; and FIG. 2 is a section taken along the line 2—2 of FIG. 1.

GENERAL DESCRIPTION OF THE PREFERRED EMBODIMENT

Referring to the drawings in particular the invention embodied therein comprises a guide rod generally designated 50 which includes a first guide rod part generally designated 1 which is telescopically interengaged with a second guide rod part generally designated 2. The first guide rod part 1 includes a hollow tubular portion 3 which is engaged over a solid cylindrical portion 4 of the second guide rod part 2, each guide rod part 1 and 2 includes threaded portions 5 and 6 respectively which permit minor longitudinal length variations. Each guide rod part 1 and 2 is also provided with a respective eyelet or connecting means 7 and 8 at the respective outer ends thereof.

In accordance with the invention the first guide rod part 1 carries a rotatable lock nut having locking ring cams or raised projections 12 which engage behind similar ring cams or projections 9 of the second guide rod part 2. The cylindrical part 4 of the second guide rod part 2 includes a surface having ring cams 9 arranged in circumferentially spaced and axially extending rows with axially spaced recesses 10 between the ring cams 9 of each row. The locking nut 11 is rotatably carried at the inner end of the first guide rod part 1 but it is not movable in a longitudinal direction. The lock nut carries interior ring cams 12 which are also arranged in circumferentially spaced axially extending rows with the spacing means such that the cams 12 can engage behind the cams 9 to lock the two parts together.

As best seen in FIG. 2 biasing means are provided to bias the locking nut 11 in a direction to cause the the ring cams 12 to fit into the recesses 10 between the cams 9 on the second guide rod part 2. The biasing means comprises a return spring 14 which bears against a relatively fixed part such as a stationary abutment 15 on the cylinder 4 and an opposite end which bears against a projection 16 carried on the lock nut 11. The spring 14 supports the return movement of the lock nut and insures a rapid return of the lock nut 11 into the locking position proper which is the normal position.

The construction of the invention insures a reliable automatic locking without having to give up the desired freedom from play since a narrow tolerance is insured in the manufacture. In contrast to the locking arrangement by bolts which is done in the prior art the locking of the present invention is possible to achieve during the manufacture of the parts and their assembly. The locking may be carried out in operation very easily and the parts may be adjusted relatively before they are locked. The longitudinal adjustments of the parts may be effected by rotating the ring cam portions 12 to a position in which they extend between rows of the cams 9 and in separating the parts telescopically or moving them closer together in accordance with the direction that the adjustment is to be taken, that is to lengthen the rod member or to shorten it. The cams 9 may be arranged with very close spacing so that the longitudinal adjustment intervals may be very small. The many cams which are arranged in many rows provide a large bearing surface in contrast to the single bolt so that a high force can be transmitted through the guide rod. An operating lever generally designated 52 is associated with the locking nut 11 and it preferably includes two arm portions 52a and 52b which engage over projecting bearings or pins 54a and 54b respectively. Biasing means (not shown) are provided to bias the operating lever 52 into the locking position while the locking nut 11 is returned by the helical springs 14. The locking operation can thus be accomplished in a very short time.

In the embodiment illustrated the locking nut is secured to a collar 56 carried on the first guide rod portion 1. The locking ring 11 is secured to the collar 56 by a fine thread interengagement, but an interengagement may also be accomplished, for example, by a support having ball bearings arranged in a ring slot to reduce the frictional engagement. The parts of the locking mechanism are usually packed in a simple manner so that they are maintained always in a condition ready for use.

While specific embodiments of the invention have been shown and described in detail to illustrate the application of the principles of the invention, it will be understood that the invention may be embodied otherwise without departing from such principles.

What is claimed is:

1. A guide rod particularly for connecting parts of agricultural implements, comprising first and second telescopically interengageable rod portions each having an outer end with means for securing it to an implement part, and each having an inner end interengaged with the respective inner end of the other rod portion, a rotatable lock nut carried on said first rod portion, said first rod portion rotatable lock nut and said second rod portion having a plurality of circumferentially extending and circumferentially spaced and axially extending rows of projecting cams said cams of one of said rod portions being engageable behind the cams of the other of said rod portions to lock said rod portions together, said lock nut being rotatable with its associated projecting cams to position said cams between rows of cams of the other of said parts to adjust said first and second parts axially.

2. A guide rod according to claim 1, including means biasing said lock nut to a position in which said projecting ring cams of said lock nut engage behind the projecting ring cams of said second part.

3. A guide rod according to claim 1, including an operating lever connected to said lock nut for rotating said lock nut on said rod portion.

4. A guide rod according to claim 1, wherein said means on said first and second rod portions for securing it to an implement part includes an eyelet on each associated outer end.

5. A guide rod according to claim 1, wherein said means for securing said first and second rod portions to an implement part includes an eyelet threadably carried at the outer end of each of said parts, said lock nut not being threaded to said first part for axial adjustment therealong.

6. A guide rod according to claim 5, including a biasing spring biasing said lock nut into a position in which said projecting cams lock behind the projecting cams of said first rod portion.

7. A guide rod particularly for connecting parts of agricultural implements, comprising first and second telescopically interengageable rod portions each having an outer end with means for securing it to an implement part and each having an inner end which is interengaged with the respective inner end of the other rod portion, a rotatable lock nut carried on said first rod portion, a projecting cam carried on said lock nut and on said second rod portion, said lock nut projecting cam being rotatable behind the projecting cam of the second rod portion to interengage said second rod portion with said projecting cam and being rotatable with it to move its projecting cam out of alignment with the projecting cam on said second rod portion to permit axial adjustment of said rod portions.

8. A guide rod according to claim 7, including spring means biasing said lock nut to a locked position.

* * * * *